United States Patent [19]

Taniguti et al.

[11] Patent Number: 4,688,184
[45] Date of Patent: Aug. 18, 1987

[54] SYSTEM FOR MEASURING THREE-DIMENSIONAL COORDINATES

[75] Inventors: Ryosuke Taniguti; Hidenori Kohmo; Manabu Kubo; Takashi Ikeda, all of Nagasaki, Japan

[73] Assignee: Mitsubishi Denki Kabushiki Kaisha, Japan

[21] Appl. No.: 716,922

[22] Filed: Mar. 28, 1985

[30] Foreign Application Priority Data

Mar. 29, 1984 [JP] Japan .................................. 59-62507
Mar. 29, 1984 [JP] Japan .................................. 59-62508

[51] Int. Cl.$^4$ ............................................. G01B 11/24
[52] U.S. Cl. .................................... 364/560; 356/376; 356/372
[58] Field of Search ....................... 364/560, 562, 550; 356/376, 372; 33/503-505

[56] References Cited

U.S. PATENT DOCUMENTS

| | | | |
|---|---|---|---|
| 4,088,408 | 5/1978 | Burcher et al. .................. | 356/376 X |
| 4,158,507 | 6/1979 | Himmel ............................. | 356/376 |
| 4,375,921 | 3/1983 | Morander ....................... | 364/560 X |
| 4,498,778 | 2/1985 | White .................................. | 356/376 |

Primary Examiner—Errol A. Krass
Assistant Examiner—Thomas G. Black
Attorney, Agent, or Firm—Leydig, Voit & Mayer

[57] ABSTRACT

The disclosure describes a system for measuring three-dimensional coordinates comprising a position detector which detects orthogonal coordinate positions of X-, Y-, and Z-axes on a surface to be measured; a noncontact-type displacement measuring instrument which moves along the surface to be measured; a device which controls the attitude of the displacement measuring instrument; a coordinate operation processor which converts the data from said position detecting means, from said noncontact-type displacement measuring instrument, and from said device into three-dimensional coordinates of the surface to be measured; a computer which files and transfers to an external unit the data that are operated by said coordinate operation processor; and a singular point determination processor which introduces the coordinate data from said coordinate operation processor, which extracts any singular points, and which transfers the coordinates thereof to said computer.

2 Claims, 9 Drawing Figures

FIG. 6
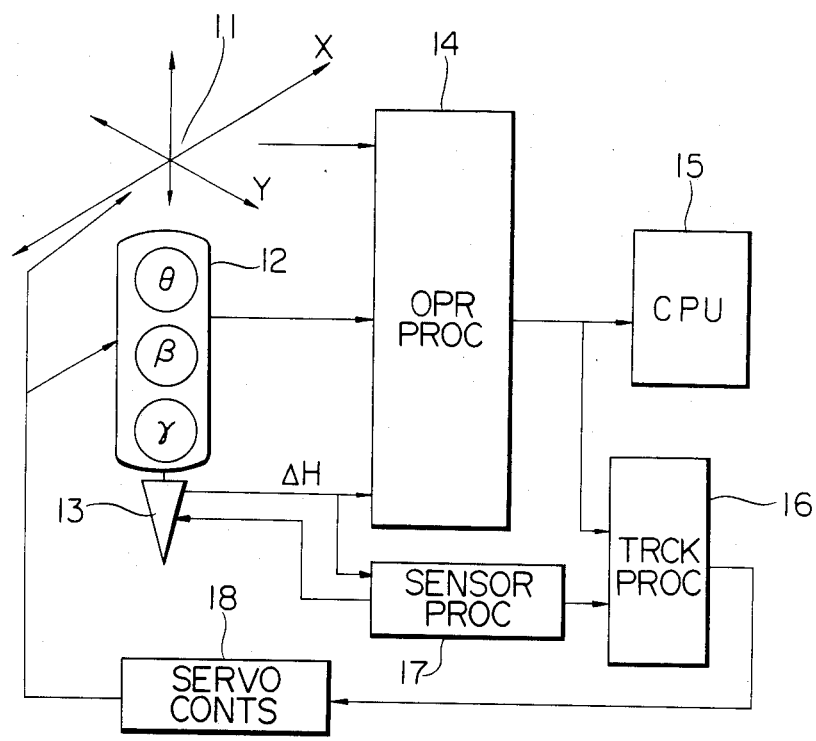
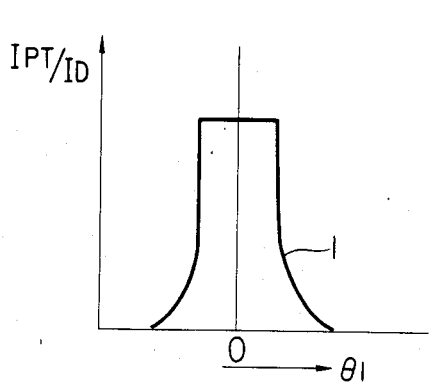
FIG. 7(a)
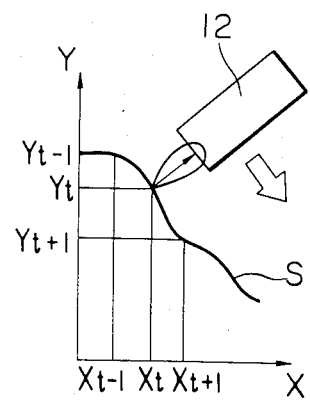
FIG. 7(b)

SYSTEM FOR MEASURING THREE-DIMENSIONAL COORDINATES

BACKGROUND OF THE INVENTION

The present invention relates to a system for measuring three-dimensional coordinates by tracking a free curved surface using a noncontact-type displacement measuring instrument such as an optical sensor, a magnetic sensor, or the like.

FIG. 1 shows a conventional three-dimensional measuring system using a noncontact-type sensor, wherein reference numeral 1 denotes a linear scale for detecting the positions of Cartesian coordinates of three axes, i.e., X-axis, Y-axis and Z-axis, 20 denotes a noncontact-type sensor that instantaneously reacts when it is brought into contact with the surface to be measured in any direction of X-axis, Y-axis or Z-axis, and 50 denotes a computer system for filing the three-dimensional coordinates.

The operation will be described hereinbelow. The contact-type sensor (hereinafter referred to as probe) 20 produces a signal instantaneously when it is held by hand and is brought into contact with the surface of an object that is to be measured. The signal is sent to the computer 50. Namely, the computer receives the coordinate data at that moment from the linear sensor and files it.

According to the conventional three-dimensional measuring apparatus constructed as described above, the measurement could be taken by simply bringing the probe into contact with points from where the measurement was to be taken. Therefore, when a curved surface S is to be measured from a point A to a point B as shown in FIG. 2, the operator judges corner points on the curved surface and brings the probe into contact therewith to take the measurement. To grasp the data of the curved surface, however, a number of points must be measured as indicated by $N_1$ to $N_{10}$ in FIG. 2. When a high degree of precision is required, therefore, the measurement must be taken involving tremendously laborious work.

SUMMARY OF THE INVENTION

The present invention was accomplished in order to automatically carry out the measurement that had hitherto been effected manually, and its object is to provide an automated system which is capable of also filing singular points automatically while taking a required number of data related to the curved surface.

BRIEF DESCRIPTION OF THE DRAWINGS

FIG. 6 is a block diagram of a noncontact-type system for automatically measuring three-dimensional coordinates according to the embodiment of the present invention; and FIGS. 7(a) and 7(b) are diagrams of characteristics showing characteristic curves of the optical sensor and the change of data with the lapse of time in the proceeding direction.

In the drawings, the same reference numerals denote the same or corresponding portions.

DESCRIPTION OF THE PREFERRED EMBODIMENTS

Figure 2:
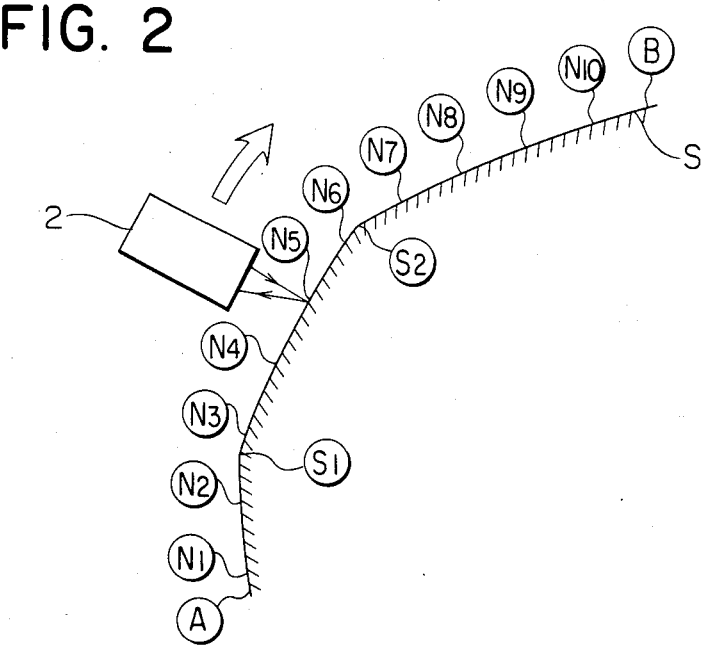
FIG. 2 is a diagram showing the surface to be measured and required points of measurement.

An embodiment of the invention will be described below in conjunction with the drawings. In FIG. 2, symbol S denotes the shape of a surface to be measured, reference numeral 2 denotes a noncontact-type displacement measuring instrument that moves along the surface S, symbols $S_1$ and $S_2$ denote corner points that the characteristic in the surface, and $N_1$ to $N_{10}$ denote coordinate positions that are spaced apart maintaining a predetermined distance.

Figure 1:
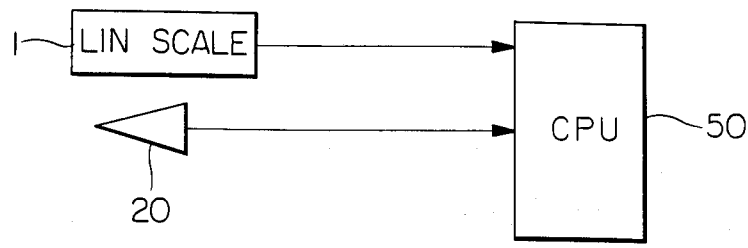
FIG. 1 is a block diagram showing a conventional three-dimensional measuring system.
Figure 3:
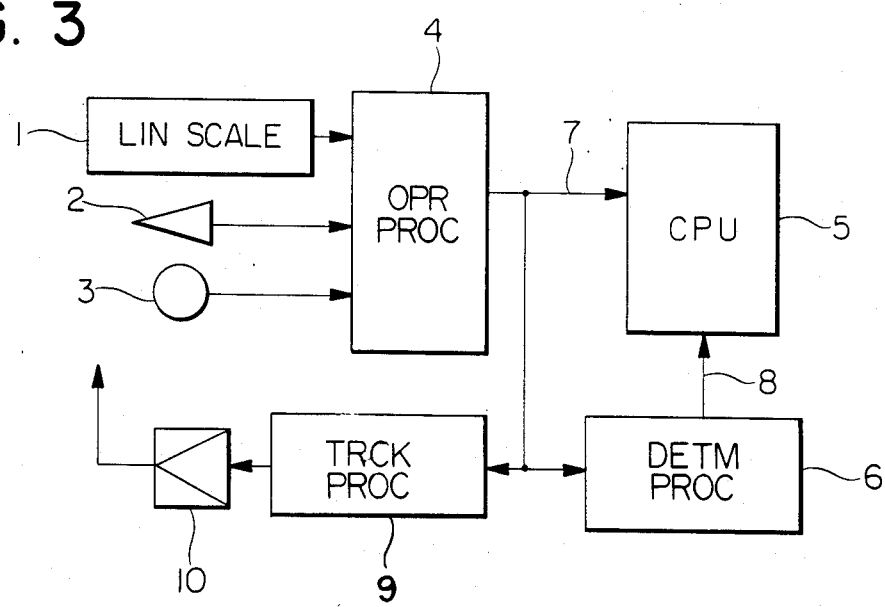
FIG. 3 is a block diagram of a system according to an embodiment of the present invention.

FIG. 3 shows a system structure according to an embodiment of the present invention, wherein reference numeral 1 denotes a linear scale or orthogonal three axes shown in FIG. 1, 2 denotes an optical displacement measuring instrument of the noncontact-type, 3 denotes an angle indexing sensor for controlling the angle of optical axis of the displacement measuring instrument 2, 4 denotes a coordinate operation processor which converts the data sent from the individual sensors into three-dimensional coordinates of the surface being measured, 5 denotes a system computer which files the data that is operated, and which transfers the data to an external unit, 6 denotes a processor which receives the coordinate data instantaneously and which determines particular shapes, 9 denotes a tracking processor which controls the X-, Y- and Z-axes of Cartesian coordinates and the angle of the noncontact-type sensor along the surface that is to be measured, and 10 denotes a servo amplifier for driving the axle.

Figure 4:
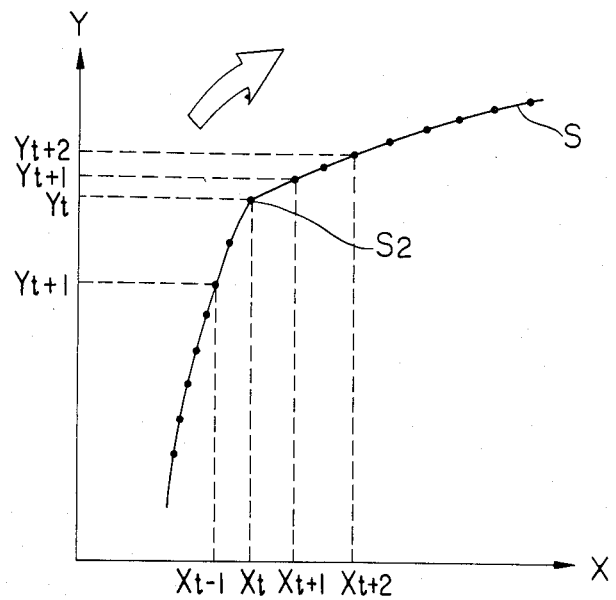
FIG. 4 is a diagram illustrating a method of detecting singular points.

FIG. 4 illustrates the idea of the system of the invention, and is an enlarged view of FIG. 2. In FIG. 4, symbols $X_{t-1}$ to $X_{t+2}$ and $Y_{t-1}$ to $Y_{t+2}$ denote coordinate positions of measurement in the vicinity of point $S_2$.

In this specification, the description does not refer to the whole system but refers to a method of detecting singular points and a system related thereto, that make the feature of the present invention.

Referring to FIG. 3, the system performs the tracking at a speed corresponding to the precision required for the object that is to be measured, and the data of sensors 1 to 3 are input at high speeds to the coordinate operation processor 4. The coordinate operation processor 4 performs the three-dimensional coordinate operation responsive to a sampling time of the sensor, and transfers the data to the filing computer 5 which files only the data of a distance that has been determined beforehand depending upon the curvature of the surface. These data are represented by $N_1$ to $N_{10}$ in FIG. 2. The data from the coordinate operation processor 4 are also transferred to the singular point determination processor 6. If the data are determined to be singular points in accordance with a determination algorithm that will be mentioned later, the singular point determination processor 6 extracts, for instance, the positions Xt, Yt of FIG. 4, and transfers them together with a X-coordinate Zt of that moment. The filing computer 5 files the above data next of a coordinate $N_6$ of FIG. 2, and files it by attaching a particular code that indicates that the data is that of a singular point.

The singular point is determined by sampling the data maintaining a very small distance as shown in FIG. 4, and monitoring the change in the coordinates $\Delta Y/\Delta X$, $\Delta Z/\Delta Y$, $\Delta Z/\Delta X$ at all times in the moving direction. The coordinates are detected when the change has increased suddenly.

According to the present invention, the singular point is detected by a system which monitors the rate of mutual change in the Cartesian coordinates. However, the rate of change with the lapse of time may be detected in the Cartesian coordinates. In this case, however, the tracking speed should be maintained constant, or reference changing rates should be determined in advance for each of the speeds.

According to the present invention as described above, provision is made of a processor to detect the rate of change at coordinate points being measured in addition to the coordinate operation processor, and the calculation is performed at a speed to correspond to a sampling time of the sensor. Therefore, corner points or dimples in the surface can be automatically measured to strikingly improve the function of the noncontact-type three-dimensional measuring apparatus.

Figures 5A, 5B:
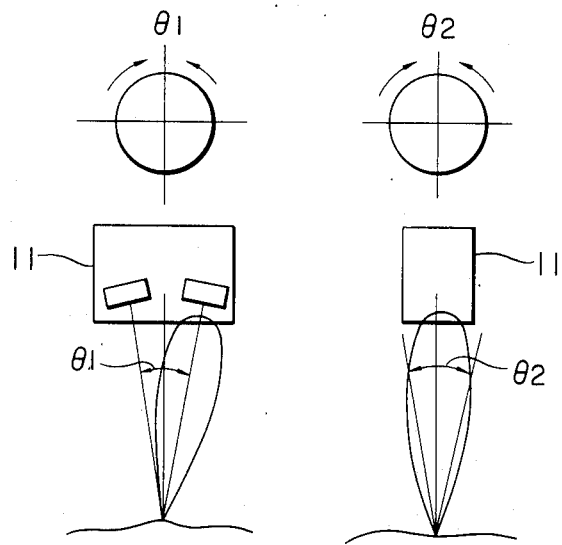
FIGS. 5(a) and 5(b) are diagrams illustrating a relation of projecting the light and receiving the light using an optical displacement measuring instrument.

FIGS. 5(a) and 5(b) are a front view and a side view of the optical noncontact-type displacement measuring instrument 2 employed in the aforementioned embodiment, and wherein symbols $\theta_1$ and $\theta_2$ denote angle control quantities in the back and forth direction, and in the right and left direction.

FIG. 6 is a block diagram which illustrates the operation of the displacement measuring instrument, wherein reference numeral 11 denotes an orthogonal three-axes moving mechanism equipped with a linear scale, 12 denotes a sensor arm mounted on the Z-axis. The sensor arm 12 controls a direction control axis $\gamma$ of the optical displacement measuring instrument 13, controls a $\theta$-axis which controls the angle control quantity $\theta_1$ of FIG. 5, and controls a $\beta$-axis which controls the angle control quantity $\theta_2$. The sensor arm 12 is further provided with three articulated axes to detect the angle thereof. To the $\theta$- and $\beta$-axes are coupled an angle encoder having a very high precision. Reference numeral 14 denotes a coordinate operation processor which operates at high speeds the three-dimensional coordinate data of the measured surfaces relying upon the linear scale data related to X-, Y- and Z-axes, the angle data of $\theta$- and $\beta$- data of the optical displacement measuring instrument, and the length of the arm, reference numeral 15 denotes a computer for filing the three-dimensional coordinates that are operated, 16 denotes a tracking processor which operates the control data that sweeps the surface to be measured while monitoring the progress of the three-dimensional coordinates, 17 denotes a sensor processor which detects the angle $\theta_1$ when it is deviated, relying upon the displacement data of the optical displacement measuring instrument and the correlation between the amount of light projected and the amount of light received, and 18 denotes a servo controller which drives all of the axes.

FIG. 7(a) is a diagram of characteristics of the optical displacement measuring instrument when the $\theta$-axis is changed, and FIG. 7(b) is a diagram explaining the control system which maintains the $\theta_2$-axis constant. In these drawings, symbol $I_{PT}$ denotes the amount of light received, and $I_D$ denotes a drive current for a light-emitting element. FIG. 7(b) further shows the change of data with the lapse of time in the proceeding direction.

The operation will be described below. In FIG. 6, coordinate operation processor 14 is served with X, Y and Z from the orthogonal three-axes moving mechanism 11, served with $\theta$ and $\beta$ from the sensor arm 12, and is served with a displacement quantity $\Delta H$ ($\gamma$ is calculated in the interior thereof) from the optical displacement measuring instrument 13. The coordinate operation processor 14 calculates the three-dimensional coordinates of the surface being measured, relying further upon the length from a position where Cartesian coordinates are mounted to the axis of rotation of the displacement measuring instrument of the sensor arm, and the data related to the distance of the displacement measuring instrument. The operated data of positions are stored in the file processor 15. The coordinate data are also input to the tracking processor 16 which compares them with the data that change with the lapse of time and that are measured thus far, and which calculates with regard to how the individual axes will move in the next time. In the direction in which the optical displacement measuring instrument proceeds, the direction ($\theta_2 = \beta$-axis in FIG. 5) of the data is determined relying upon the differentiated value of the past data and the present data. However, the direction ($\theta_1 = \theta$-axis in FIG. 5) at right angles with the proceeding direction cannot be controlled without the inclination data on both sides. Therefore, provision is made of a processor 17 which detects the inclination relying upon the relation between the angle of reflection of the optical sensor and the amount of light received as shown in FIG. 7a), and the detected quantity is fed back to the tracking processor 16, in order to precisely measure the coordinates whioe automatically maintaining the inclination of the optical displacement measuring instrument in the back and forth, and in the right and left directions at a proper value.

To control the attitude in the proceeding direction, the change of data with the lapse of time on the surface being measured is calculated as shown in FIG. 7(b), compared with the present attitude, and is corrected to maintain a predetermined angle. If a proper attitude is maintained and a proper inclination is maintained in the right and left direction, the total amount of light reflected and returned is maintained constant in the case of the optical displacement measuring instrument as shown in FIG. 7(a). If the attitude deviates, however, the amount of light reflected decreases; i.e., the reduction in the amount of light is detected, and the angle can be corrected.

In this embodiment, the $\theta_1$-axis is controlled in the right and left direction in the proceeding direction, and the $\theta_2$-axis is controlled in the back and forth direction in FIG. 5. This relation, however, may be reversed.

According to the present invention constructed as described above, the attitude or angle of the optical displacement measuring instrument in the back and forth direction in which it travels is determined relying upon the rate of change of the data with the lapse of time, and is properly maintained. The inclination of the optical displacement measuring instrument in the right and left direction is determined relying upon the amount of light received that changes depending upon the angle of reflection of the optical displacement measuring instrument, and is properly maintained by an angle that controls the inclination in the right and left direction, so that the measurement can be taken maintaining a high precision at all times based upon a stable amount of light received.

What is claimed is:

1. A system for measuring three-dimensional coordinates comprising:

position detecting means which detects orthogonal coordinate positions of X-, Y-, and Z-axes on a surface to be measured;

a noncontact-type displacement measuring instrument which moves along the surface to be measured;

a means for detecting and controlling the attitude of the displacement measuring instrument;

a coordinate operation processor which converts the data from said position detecting means, from said noncontact-type displacement measuring instrument, and from said detecting and controlling means into three-dimensional coordinates of the surface to be measured;

a computer which files and transfers to an external unit the coordinate data from said coordinate operation processor; and a singular point determination processor which introduces the coordinate data from said coordinate operation processor, which extracts any singular points, and which transfers the coordinates thereof to said computer.

2. A system for measuring three-dimensional coordinates of the noncontact-type comprising:

an orthogonal three-axes moving mechanism in the directions of X-, Y-, and Z-axes equipped with a linear scale;

an optical displacement measuring instrument of the reflection type;

means for controlling said optical displacement measuring instrument in the back and forth direction, in the right and left direction, and in the proceeding direction with respect to the surface of measurement and for detecting the angle thereof, said controlling and detecting means including a sensor arm provided with three articulated axes;

a coordinate processor which converts data from said optical displacement measuring instrument and said controlling and detecting means into three-dimensional coordinate positions of the surfaces to be measured;

a sensor processor which detects the angle of inclination with respect to the surface of measurement based upon the amount of light projected by the optical displacement measuring instrument and the total amount of light received;

a tracking processor which controls the orthogonal three axes and the articulated three axes relying upon the data of three-dimensional coordinates that change with the lapse of time and the data of inclination of said sensor processor, and which pinpoints the light projected by the sensor on the surface to be measured maintaining a proper angle; and a computer which files the three-dimensional data.

* * * * *